July 31, 1962
C. L. WESTBROOK
3,046,878
TICKET MARKING MACHINE
Filed Oct. 23, 1959
9 Sheets-Sheet 1
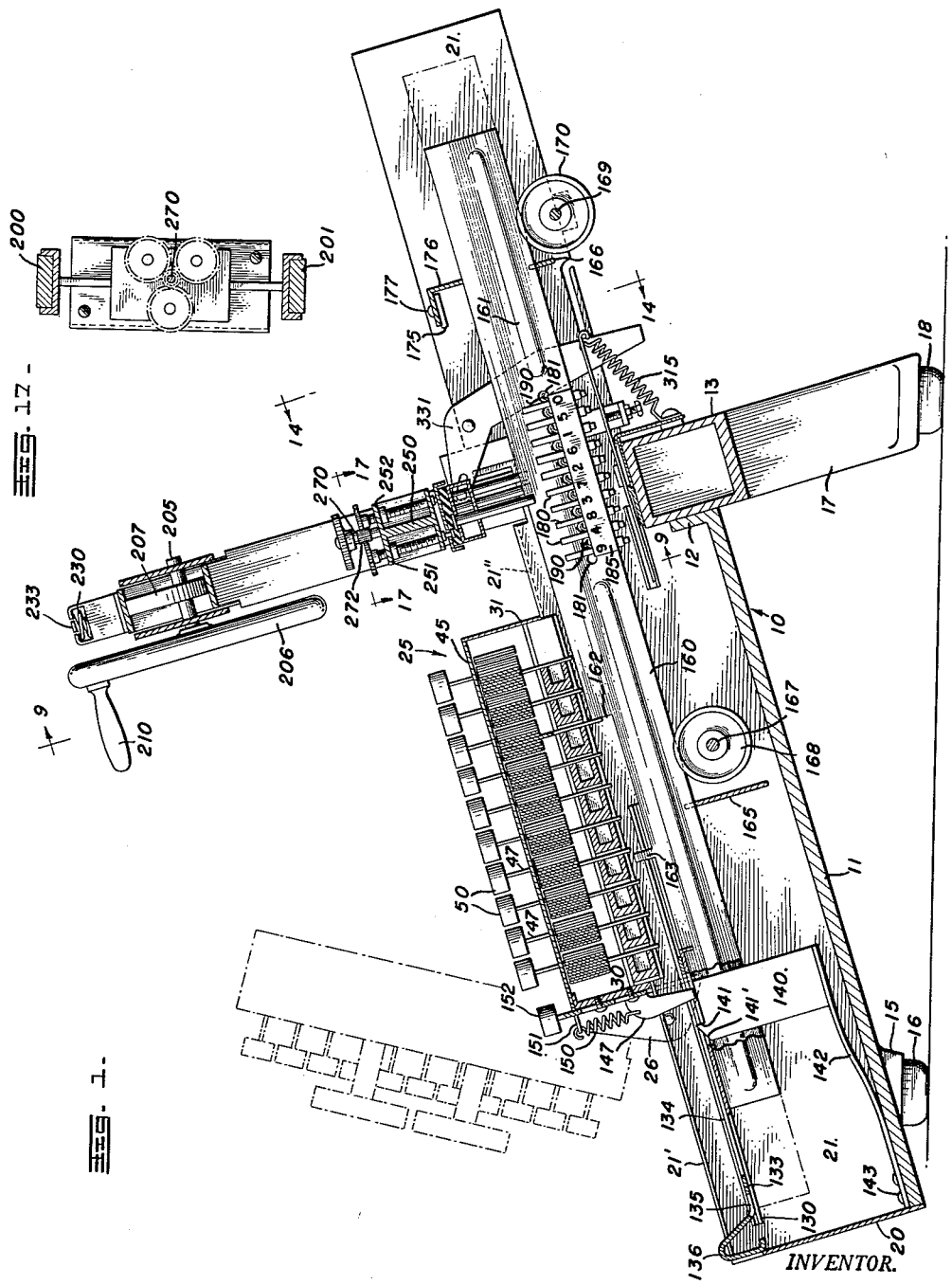
INVENTOR.
CHARLES L. WESTBROOK
BY
Shoemaker & Mattare
ATTORNEYS

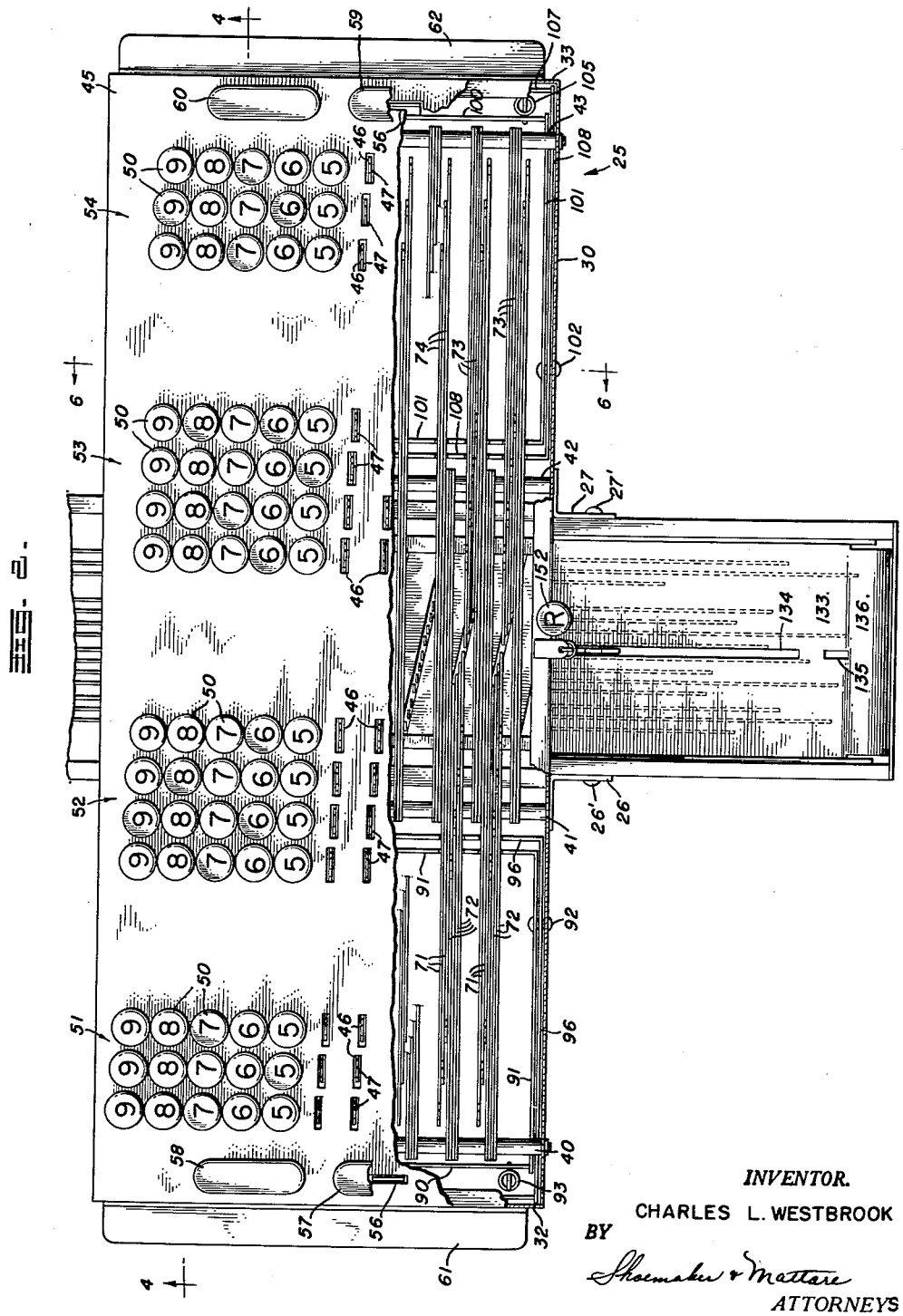

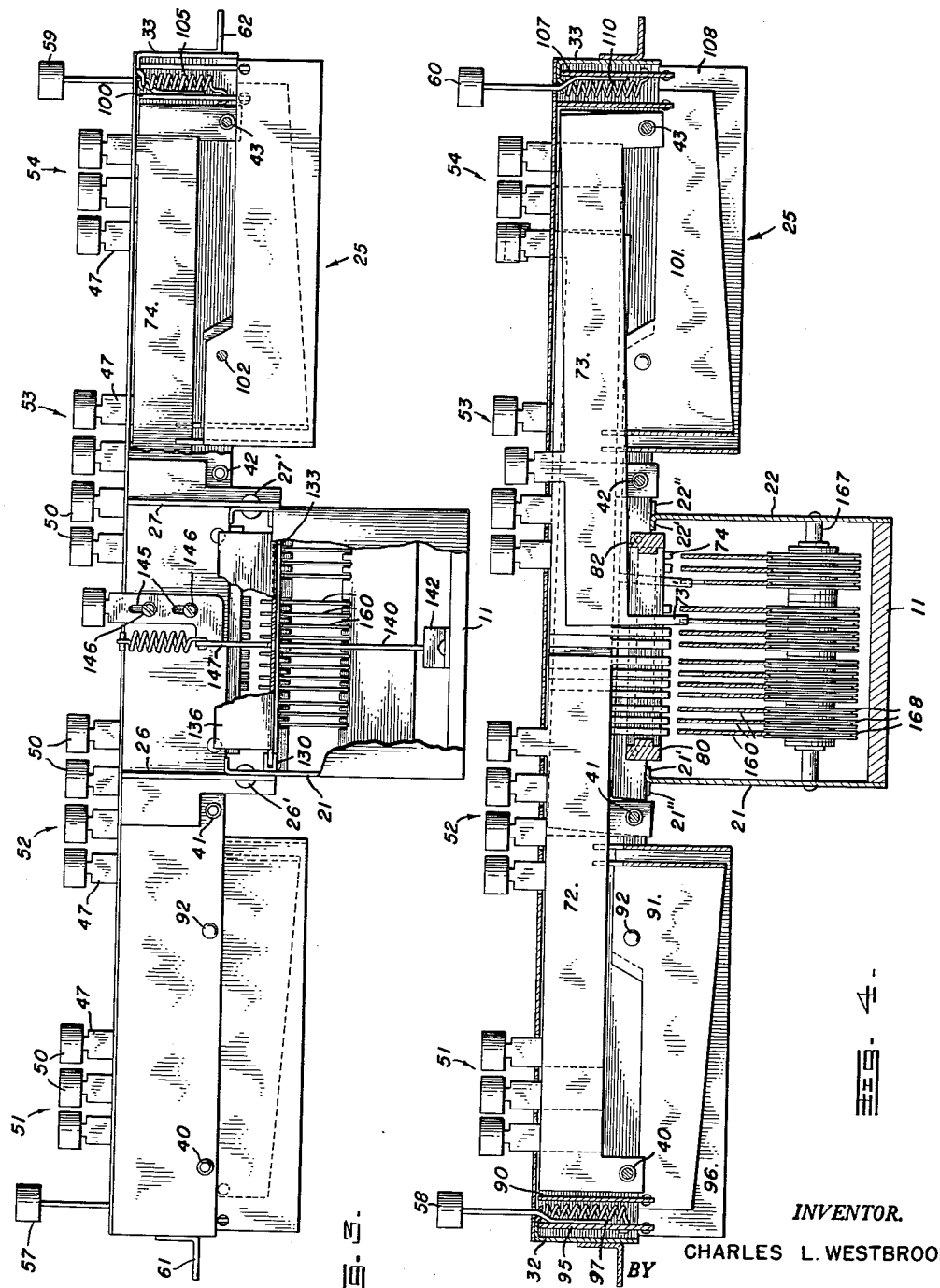

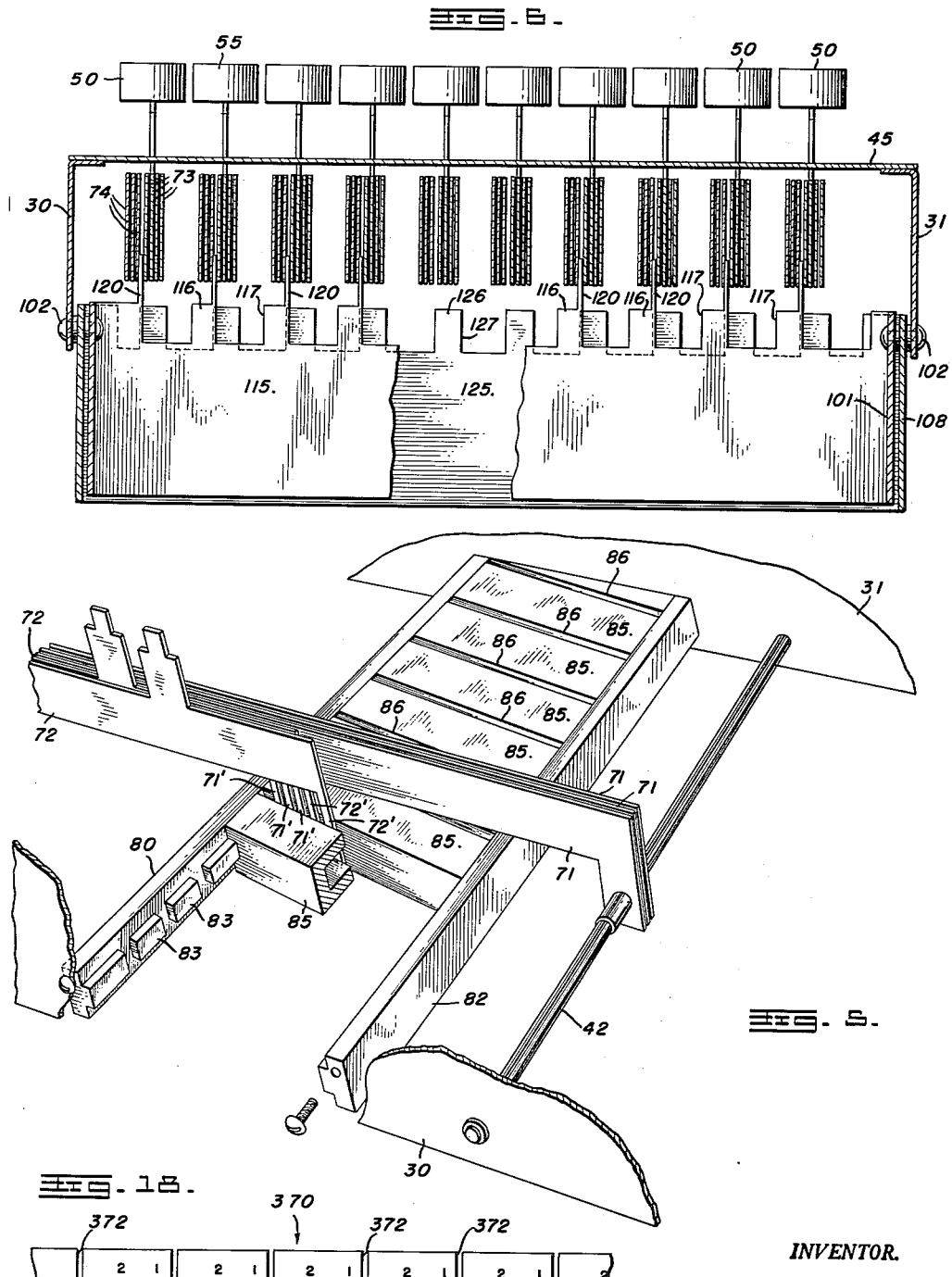

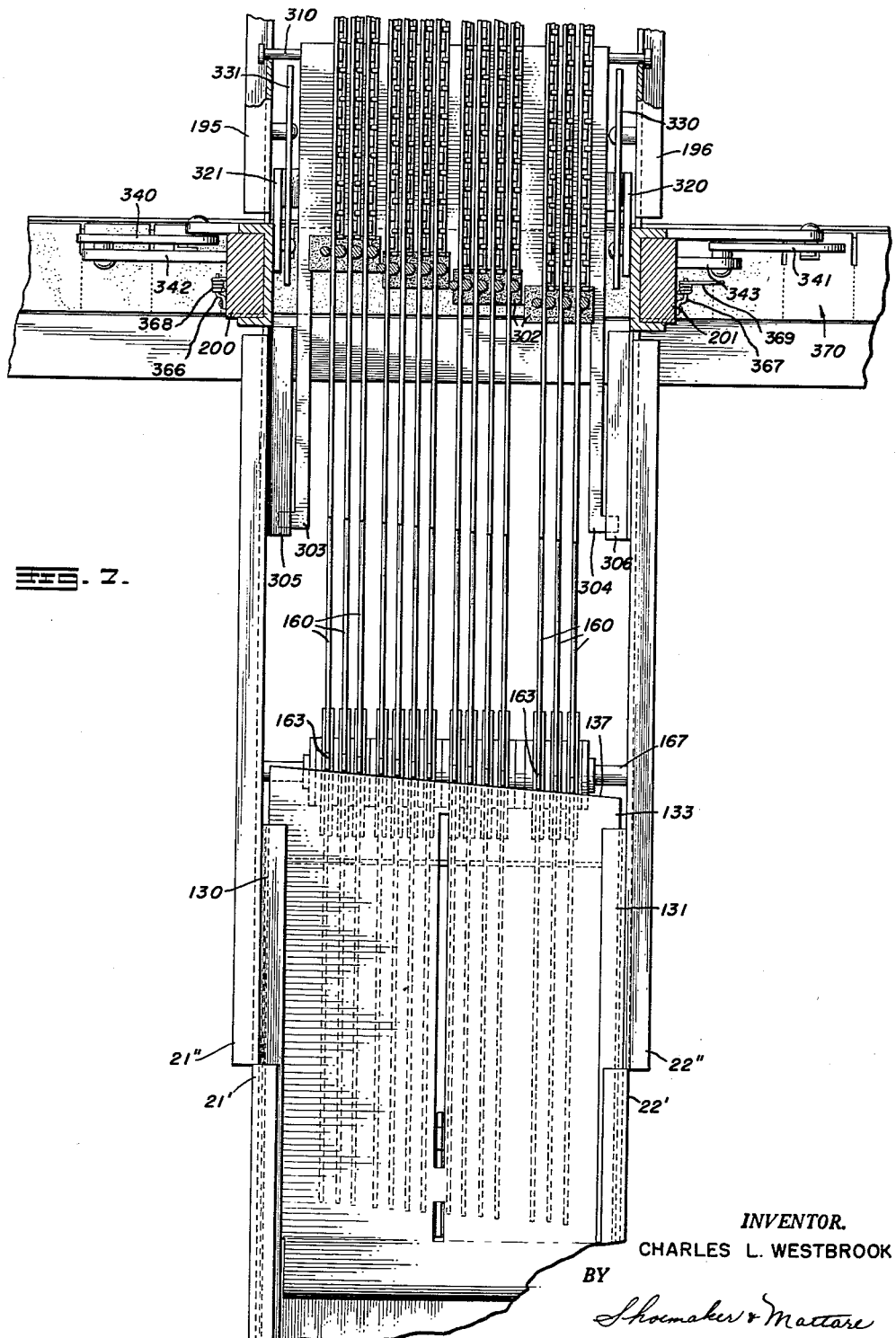

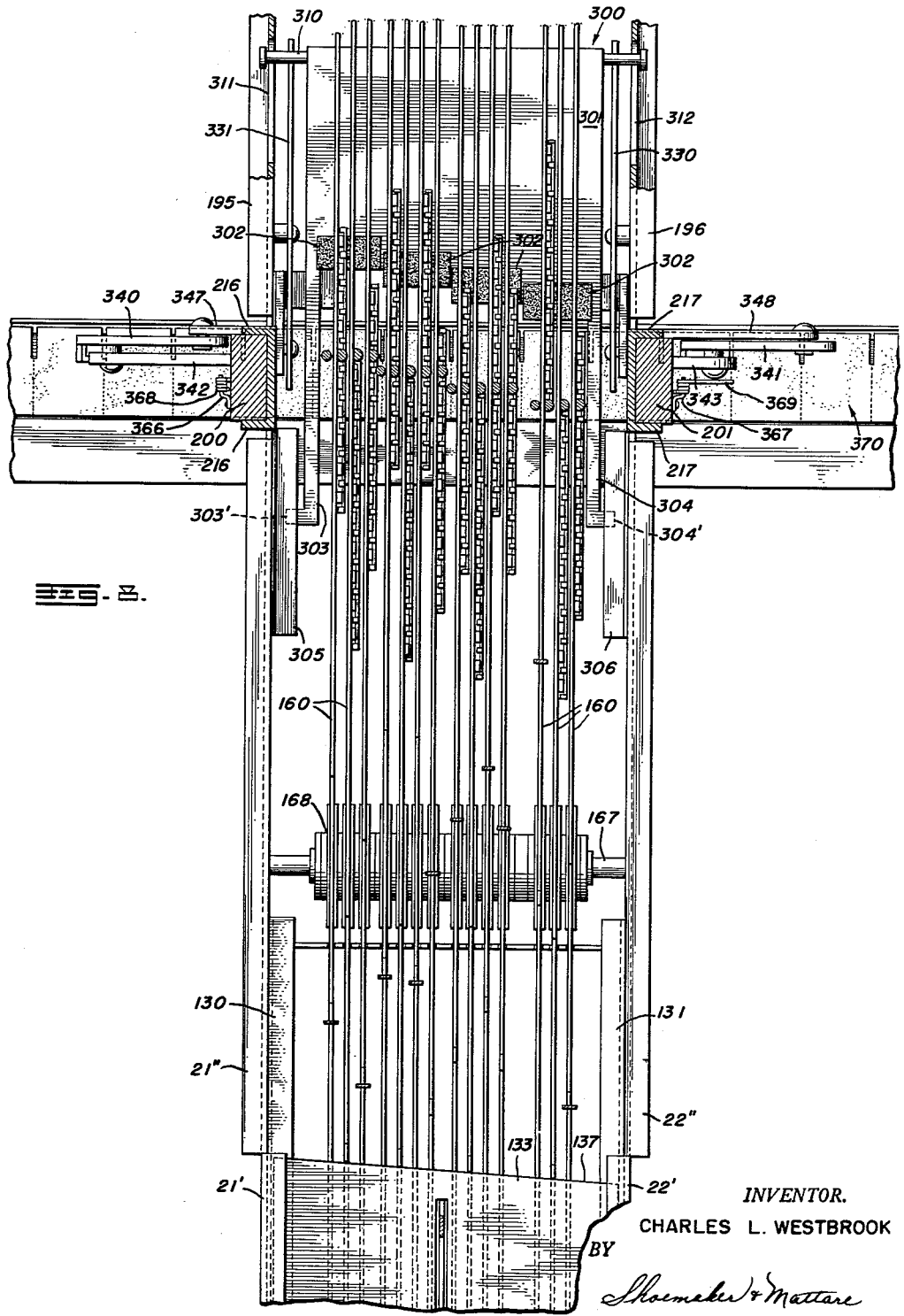

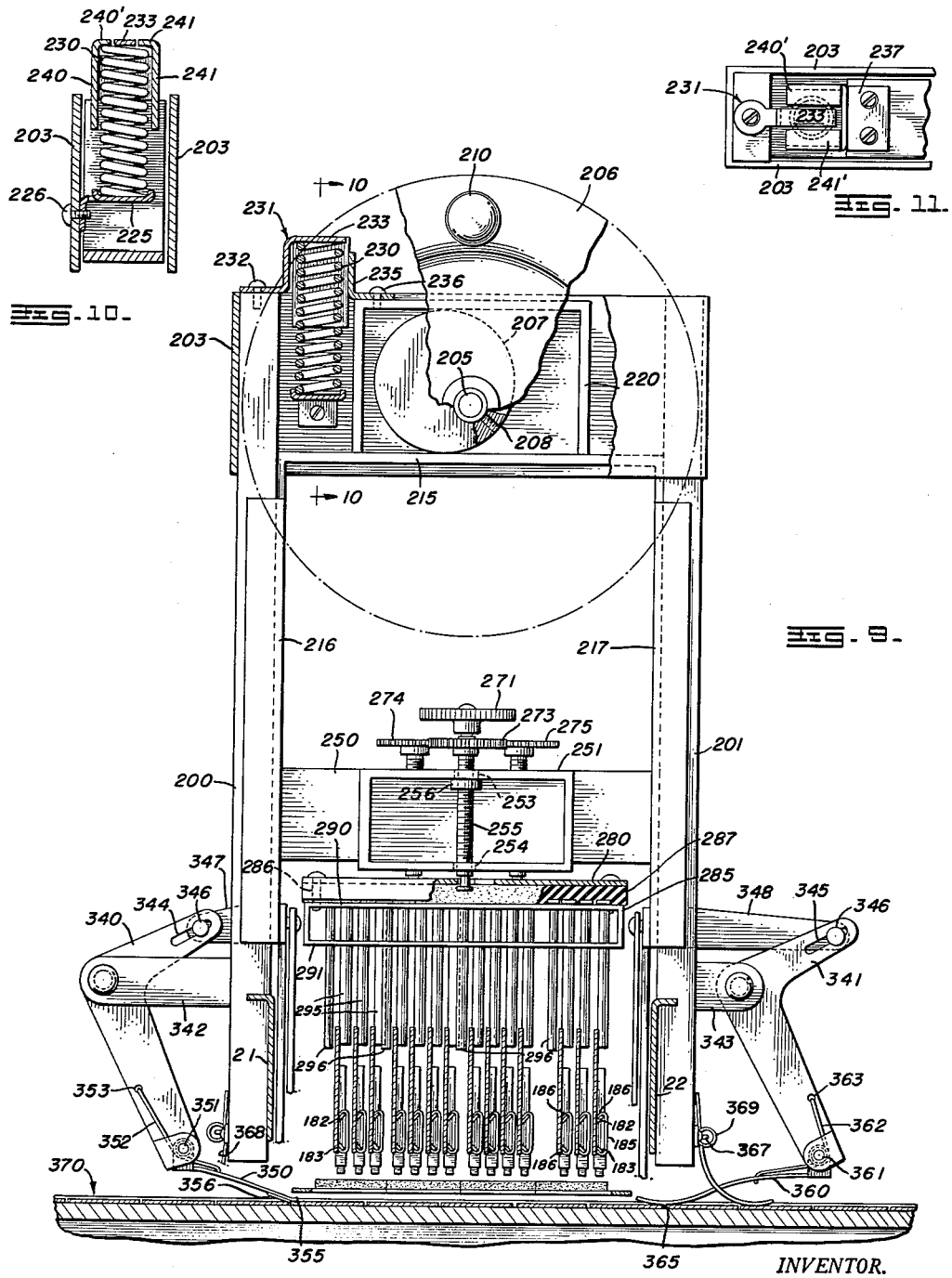

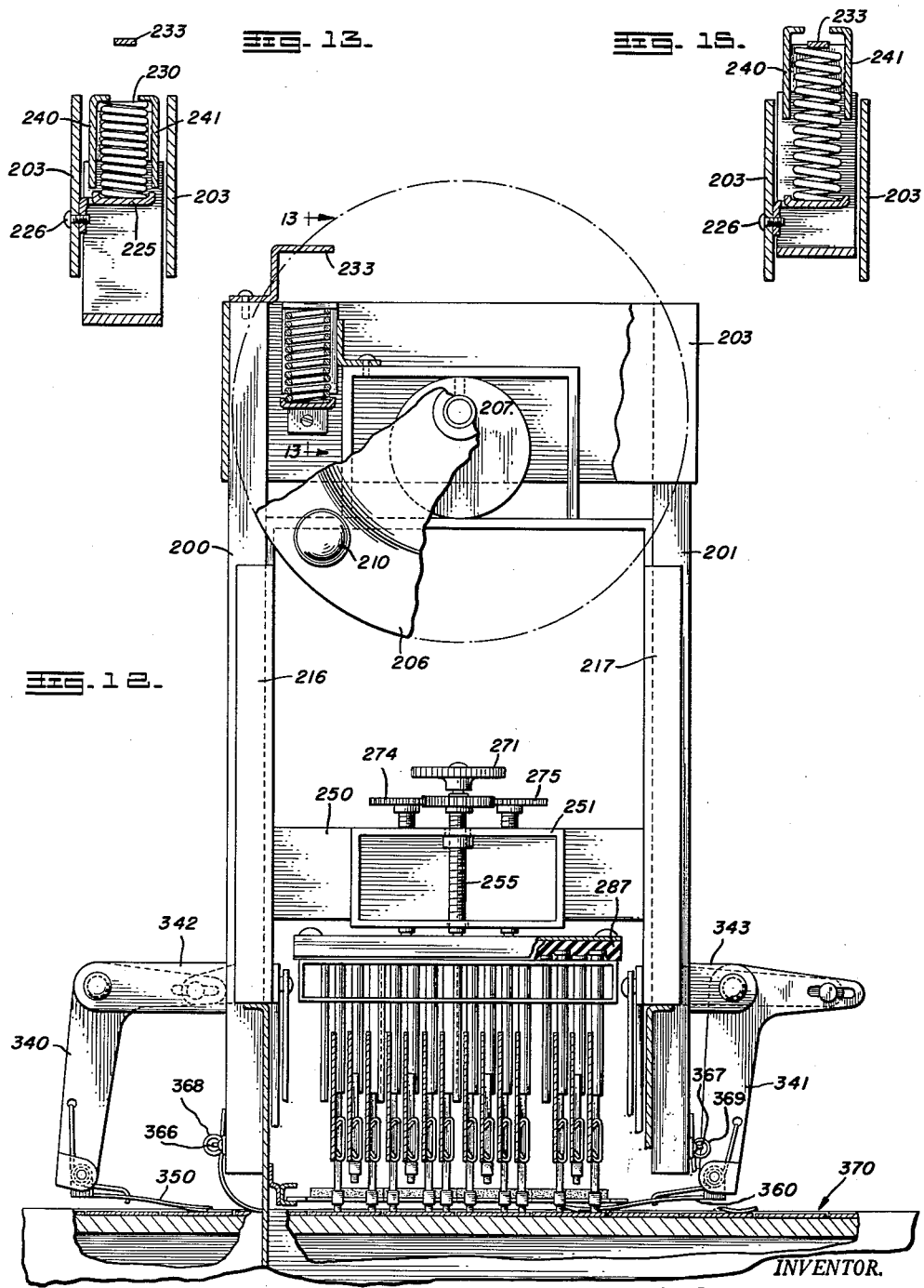

July 31, 1962  C. L. WESTBROOK  3,046,878
TICKET MARKING MACHINE
Filed Oct. 23, 1959  9 Sheets-Sheet 9
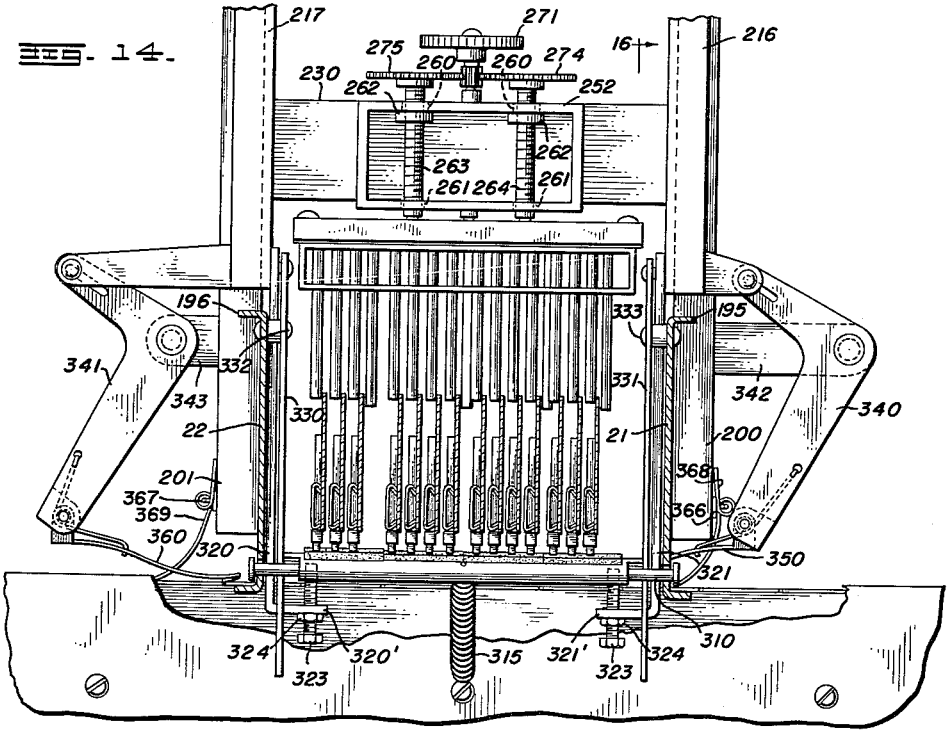
ΞΙΞ. 14.
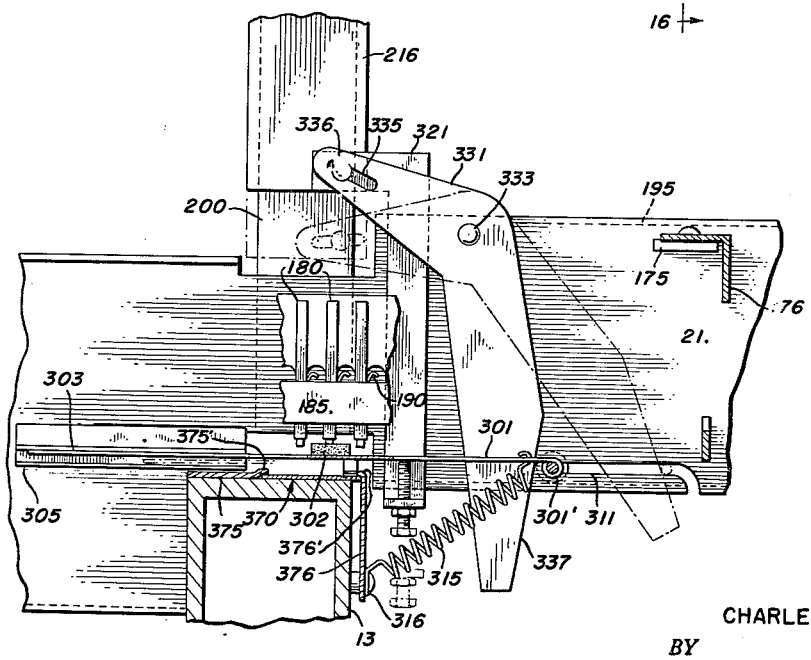
ΞΙΞ. 16.
INVENTOR.
CHARLES L. WESTBROOK
BY
Shoemaker & Mattare
ATTORNEYS

United States Patent Office 3,046,878
Patented July 31, 1962

3,046,878
TICKET MARKING MACHINE
Charles L. Westbrook, 510 Park Ave., Ayden, N.C.
Filed Oct. 23, 1959, Ser. No. 848,308
34 Claims. (Cl. 101—93)

The present invention relates to a new and novel ticket marking machine, and more particularly to a machine which is adapted to selectively imprint various characters in a plurality of rows on a ticket.

The present invention is particularly adapted for use in printing information upon tickets which are attached to merchandise as sold for example in a department store and the like. Such tickets are generally provided with various printing indicating certain desired information such as size, cost, sale price, tax, and various other well-known data which is useful in identifying various characteristics of the article.

In large scale operations, it is often necessary to imprint such data on a very large number of tickets, thereby necessitating the utilization of some sort of printing means which is adapted to print certain information in a rapid and efficient manner upon very many tickets. In addition, the machine must not only be capable of rapid operation, but the printed information often must be changed for different articles, and accordingly the machine should incorporate a means for quickly and efficiently varying the information which is printed thereby.

It is accordingly evident that a successful machine of this type must include means for readily selecting the matter printed thereby, and once set up, the machine must be capable of rapid and relatively fool-proof operation. Additionally, the information printed on this type of ticket is desirably printed along a plurality of rows displaced one beneath the other, and accordingly means must be provided for producing a plurality of lines of print. It is of course evident that the machine according to the present invention may be employed for printing on items other than the aforementioned tickets, but, however, the invention device is especially adapted for this type of operation.

While the information which is to be printed may vary within wide limits, for the sake of illustration and simplicity, the invention is illustrated as printing a plurality of lines of digits. It is pointed out that throughout the description it will be readily recognized various other printing characters could be substituted for the digits incorporated on each of the printing members to illustrate the device. Furthermore, the apparatus as illustrated is shown as being manually operated, whereas it could obviously be driven by any suitable driving means such as an electric motor or the like.

In order to rapidly print a great number of tickets, the invention device is adapted to operate with an elongated strip of tickets, the individual tickets being separated from one another by perforations such that the tickets can be subsequently separated from one another after having passed through the machine and having the printed material impressed thereon. The machine incorporates an advancing mechanism which sequentially advances the strip of tickets through the machine in a stepped manner such that the tickets have printing impressed thereon in various stages as the tickets progress through the machine. This advancing mechanism for the strip of tickets is associated with the operating means of the machine such that it is automatically operative during the working cycles of the apparatus.

The machine incorporates a supporting frame upon which a keyboard selecting mechanism is mounted. This keyboard selecting mechanism incorporates a plurality of groups of keys, each of these groups producing a line of printing on the tickets, and sufficient keys being provided in each group to permit a wide variation in the selected printing matter. In the example illustrated herein, four groups of selecting keys are illustrated which result in producing four lines of printing on each of the tickets. It should be noted that the number of groups of keys can be varied as desired in accordance with the number of lines of printing which it is desired to produce. As illustrated, each of the groups of keys includes a plurality of rows of keys, the rows being shown for the convenience of illustration as each incorporating 10 keys representing the digits 0 to 9, thereby permitting three and four digit numbers of any denomination to be printed on the various lines. It is evident that the number of keys in any given row may be varied as desired to include additional keys with other printing characters than digits.

Each of these keys is associated with an arm which has formed thereon a stop finger, these stop fingers serving to selectively position other components of the apparatus as will hereinafter appear. A means is provided for maintaining the keys and stop fingers in operative position wherein they are depressed or in inoperative position wherein they are raised such that the keys and stop fingers will remain in a given position. Means is also provided for selectively returning all of the keys in each group of keys to their inoperative positions when it is desired to alter the setting of the device.

A plurality of elongated slide bars are mounted upon rollers supported by the frame, the frame being disposed at an angle to the horizontal such that the slide bars normally tend to slide downwardly under the influence of gravity. These slide bars are provided with stop shoulders and stop members formed integral therewith for engaging the stop fingers of the selecting mechanism for positioning the slide bars in any desired location. Movably mounted upon each of the slide bars for movement transversely thereof are a plurality of printing members, these printing members having formed at one end thereof the printing characters which are pressed against the tickets passing through the machine.

The operating mechanism of the apparatus includes a reciprocating yoke having resiliently connected thereto a plurality of push rods. Each of these push rods is adapted to engage one of the printing members on one of the slide bars for urging the associated printing members into and of printing relationship to the tickets. The push rods themselves are magnetic, and the printing members are formed of magnetic material such that the printing members are caused to follow the movement of the associated push rods. Means is also provided for selectively adjusting the position of the push rods with respect to the reciprocating yoke mechanism.

As shown, a manually operated cam mechanism is employed for selectively reciprocating the yoke, however, other well-known driving means may be employed for this purpose.

A spring means is incorporated for normally biasing the reciprocating yoke mechanism to a neutral position, and an indicator device is provided for indicating to an operator what position the machine is in, in its cycle of operation such that the operator will be quickly advised as to just what position the various components of the device are in with respect to one another.

In a printing mechanism of this type, it is also necessary to incorporate an automatic inking means whereby the selected printing members will be inked during each cycle of operation of the machine so as to insure that the printed characters will produce a proper impression on the tickets. Accordingly, the printing mechanism of the invention moves longitudinally with respect to the slide bars thereof to position the ink pads of the mechanism beneath the proper printing members, the ink pads being reciprocated out of the path of the printing members during the printing portion of the operating cycle and then being reciprocated back beneath the printing members during the inking portion of the operating cycle. A further feature of the printing mechanism is the fact that the printing means is mounted not only for movement longitudinally of the slide bars, but also laterally thereof so as to permit the ink pads to be moved toward and into engagement with the printing characters formed at the end portions of the printing members.

In order to produce the desired longitudinal and lateral shifting of the printing means, a first lever mechanism is operatively connected to the driving means of the apparatus to cause the printing pad support means to be reciprocated longitudinally. This longitudinal movement is caused in cooperation with a spring means which normally biases the printing pad support means in one direction. A lifter mechanism is also provided, this lifter mechanism being operatively connected for reciprocatory movement with the reciprocating yoke and having means formed thereon adapted to engage the ink pad support means for moving the ink pads toward the printing members. As mentioned previously, the slide bars mounting the printing members thereon are freely movable with respect to the supporting frame. In order to selectively position the slide bars, a plate is slidably supported by the supporting frame and includes an end edge portion which engages the stop members on the slide bars to urge all of the slide bars upwardly away from the keyboard selecting mechanism. A detent means is provided for holding the plate and slide bars in such raised position while the keys are selectively actuated, whereupon the detent is released and the plate as well as the slide bars are permitted to move downwardly under the influence of gravity into the desired selected position.

An object of the present invention is to provide a ticket marking machine which prints a plurality of lines of printing one under the other on the individual tickets of a strip of tickets advanced therethrough.

Another object of the invention is to provide a ticket marking incorporating means for easily selecting and varying the pinted matter which is impressed on the tickets A further object of the invention is to provide a ticket marking machine which includes printing mechanism which is positive acting and yet which is cushioned against shock when the printing characters engage the tickets.

Yet another object of the invention is to provide a ticket marking machine including an effective inking means which serves to ink selected printing characters during each cycle of operation of the apparatus.

A still further object of the invention is to provide a ticket marking machine including means for sequentially advancing the individual tickets through the machine such that the various lines of printing are impressed thereon at different stages.

Another object of the invention is to provide a ticket marking machine which is easily operated and which is substantially fool-proof in operation.

An additional object of the invention is the provision of a ticket marking machine which is relatively compact and inexpensive in construction, and yet which is efficient and reliable in operation.

Other objects and many attendant advantages of the invention will become more apparent when considered in connection with the specification and accompanying drawings, wherein:

FIG. 1 is a longitudinal section of the illustrated embodiment of the ticket marking machine;

FIG. 2 is a plan view partly cut away of a portion of the machine illustrating the keyboard selecting mechanism;

FIG. 3 is a front view of the portion of the machine as shown in FIG. 2 partly cut away to illustrate the internal mechanism;

FIG. 4 is a sectional view taken substantially along line 4—4 of FIG. 2, looking in the direction of the arrows;

FIG. 5 is a perspective view partly broken away of a portion of the keyboard selecting mechanism of the apparatus;

FIG. 6 is a sectional view taken substantially along line 6—6 of FIG. 2, looking in the direction of the arrows;

FIG. 7 is a top view partly broken away of a portion of the apparatus with the keyboard selecting mechanism removed for the sake of clarity, and illustrating the slide bar mechanism in one position;

FIG. 8 is a view similar to FIG. 7 showing the slide bar mechanism in another operative position;

FIG. 9 is a sectional view partly broken away taken substantially along line 9—9 of FIG. 1, looking in the direction of the arrows and showing the printing mechanism in one operative position;

FIG. 10 is a sectional view taken along line 10—10 of FIG. 9 looking in the direction of the arrows;

FIG. 11 is a top view of the indicator mechanism shown in FIG. 10;

FIG. 12 is a view similar to FIG. 9, showing the printing mechanism of the device in another operative position;

FIG. 13 is a sectional view taken along line 13—13 of FIG. 12 looking in the direction of the arrows;

FIG. 14 is a sectional view partly broken away taken substantially along line 14—14 of FIG. 1, looking in the direction of the arrows and showing the printing mechanism in still another operative position;

FIG. 15 illustrates the position of the indicator mechanism when the printing mechanism is in the position shown in FIG. 14;

FIG. 16 is a sectional view taken substantially along line 16—16 of FIG. 14 looking in the direction of the arrows;

FIG. 17 is a sectional view taken along line 17—17 of FIG. 1 looking in the direction of the arrows; and FIG. 18 illustrates a typical strip of tickets and the manner in which the printing is impressed thereon.

Referring now to the drawings wherein like reference characters designate corresponding parts throughout the several views, there is shown in FIG. 1 the overall machine including a supporting frame indicated generally by refernce numeral 10 and including a bottom wall member 11 having an upturned flange 12 at one end thereof secured as by welding or the like to a tubular member 13 of substantially square cross section. A pair of legs 15, one of which is shown in FIG. 1, are attached to bottom member 11 adjacent the lower end thereof and each of the legs is secured to a resilient support pad 16 formed of rubber or the like. A pair of spaced legs 17, one of which is shown in FIG. 1, are attached to the lower portion of tubular member 13, each of legs 17 having a support pad 18 formed of rubber or the like secured to the lower surface thereof. It is evident that legs 17 are substantially longer than legs 15, the purpose of this arrangement being to mount the support frame on an angle with respect to the horizontal, this being evident since bottom member 11 of the frame is inclined with respect to the support surface which is assumed to be horizontal.

The support frame also includes an end wall 20 and side walls 21 and 22, the end wall being connected to the lower ends of each of the side walls, and each of the end and side walls being secured to the lower wall 11, these various walls being secured as by welding or the like to provide a rigid framework adapted to support the remaining components of the apparatus. Each of side walls 21 and 22 extend forwardly beyond tubular member 13 in a manner hereinafter described to provide a rigid unitary framework. Wall 21 is provided with an inturned flange 21′ at the upper edge thereof which extends from a point adjacent end wall 20 about ⅓ of the distance to tubular member 13, and an outturned flange 21″ is formed at the upper edge thereof to a point overlying the tubular member 13. In a like manner, wall 22 is provided at its upper edge with an inturned flange 22' and an outturned flange 22". These flanges formed integral with the upper edges of the side walls serve as a means for rigidifying the upper edges of the side walls and flanges 21" and 22" serve as a support for the keyboard mechanism of the apparatus.

Referring now particularly to FIGS. 1–6 the keyboard selecting mechanism is illustrated, the mechanism being indicated generally by reference numeral 25. The keyboard mechanism is pivotally mounted upon the supporting frame by means of a pair of hinges 26 and 27, each of these hinges including a first leg portion which is pivotally secured to the associated side walls of the frame as indicated at 26' and 27' respectively, the other leg portion of each of the hinges being attached as by welding or the like to the framework of the keyboard selecting mechanism. This arrangement permits the keyboard mechanism to be pivoted upwardly and rearwardly into the dotted line position shown in FIG. 1 to gain access to the interior of the machine if it is desired to repair or replace certain components of the keyboard itself or of the slide bar mechanism therebeneath.

The keyboard selecting mechanism includes a substantially rectangular framework including a front wall 30, a rear wall 31, and a pair of end walls 32 and 33 extending between the adjacent end portions of the front and rear walls. Four shafts 40, 41, 42, and 43 have the opposite end portions thereof mounted in suitable openings provided in the front and rear walls 30 and 31 of the keyboard frame, these shafts being retained in position in the openings in the walls by suitable flanges formed thereon, and serving as means for pivotally mounting the various arms connected with the keys of the apparatus.

A top wall 45 is supported on the upper edges of the frame of the keyboard mechanism and is secured to the frame in any suitable manner. Top wall 45 is provided with a plurality of slots therethrough through which extend the arms upon which the various keys are mounted. The slots for receiving the arms are indicated by reference numeral 46 in FIG. 2, the arms extending upwardly through the slots being indicated by reference numeral 47 as seen in FIG. 2, the keys themselves having been removed from certain ones of the arms 47 to illustrate the manner in which the arms extend upwardly through the slots. The keys themselves are of the type generally formed on computing machines wherein the digits are impressed in the keys, the various keys being illustrated by reference numeral 50 and having a recessed upper surface as is well known for accommodating the fingers of an operator. The keys are generally marked with indicia indicating which printing characters will be actuated when a certain key is pressed down. In the present example, the various keys 50 are shown as representing the digits 0–9 and are marked accordingly. It will be noted that the keys are arranged in four groups indicated generally by reference numerals 51, 52, 53 and 54, each of these groups producing a different line of printing upon the tickets as explained hereinafter. The keys 50 are removably attached to the upper reduced end portions of arms 47 in a conventional manner.

Top wall 45 is also provided with a pair of slots 56 at each end thereof, these slots receiving arms connected to the clearing mechanism of the keyboard as hereinafter described. Let it suffice for the time being to mention that the clearing keys mounted on the arms extending through slots 56 are indicated by reference numerals 57, 58, 59 and 60, each of these clearing keys being adapted to raise all of the keys of one of the groups of keys into their raised or inoperative position. It will be noted that an L-shaped channel member 61 is secured to end wall 32 and a similar L-shaped channel member 62 is connected to end wall 33, these L-shaped channel members providing a laterally extending projection under which the fingers of an operator's hand may be placed while the thumb is placed on one of the clearing keys thereby providing a good leverage for pressing down the clearing keys 57–60.

Each of the keys of the group of keys 51 is connected to an arm 71, the opposite end of which is rotatably supported by shaft 42. This arrangement may be seen especially in FIG. 5, whereby it is apparent that each of arms 71 is supported at its righthand end for rotation about shaft 42. These three arms 71 as illustrated in FIG. 5 have integral depending stop fingers 71' connected thereto for a purpose hereinafter described. Each of the keys in the group 52 is connected to an arm 72 having the opposite end portion thereof supported for rotation around shaft 40, FIG. 5 illustrating two of such arms 72, each of these arms 72 having an integral depending stop finger 72' formed at the opposite end portion thereof for a purpose hereinafter described.

Each of the keys in the group of keys 53 is connected with an arm 73, arms 73 having one end portion thereof journaled about shaft 43 and having depending stop fingers 73' formed at the opposite end portion thereof for a purpose hereinafter described. Each of the keys in the group of keys 54 is connected to an arm 74 pivotally supported on shaft 41 and having depending stop fingers 75' formed at an intermediate portion therof for a purpose hereinafter described.

Referring now particularly to FIG. 5, a pair of magnetic supporting members 80 and 82 extend between and are supported at opposite ends thereof by the front and rear walls 30 and 31 of the keyboard frame. Each of these magnet support members has formed on the inner faces thereof a plurality of spaced supporting bosses indicated by reference numeral 83 having a substantially rectangular cross section. A plurality of magnets 85 which may comprise any suitable permanent magnetic material such as Alnico, are provided, each of these magnets having a substantially U-shaped cross sectional configuration. The magnets are mounted between the support members 80 and 82 such that the bosses 83 fit within the opposite ends of the channels defined by the magnets whereby the magnets are supported at the opposite end portions thereof by bosses 83. The bosses on support members 80 and 82 are offset such that the magnets extend at a slight angle thereto as seen in FIG. 5, the ends of the magnets being correspondingly sloped to fit snugly in position as shown. Magnets 85 are spaced from one another to define spaces 86 therebetween, these spaces being adapted to receive the stop fingers formed on the various arms 71—74.

In the example given, each row of keys incorporates 10 members representing 10 digits 0–9 such that for each row of keys there are 10 arms connected therewith having 10 stop fingers formed integrally therewith. The magnets 85 are spaced to provide 10 spaces 56 adapted to receive the stop fingers formed on the arms. The arrangement is such that looking at FIG. 5, the topmost space 86 is adapted to receive all of the stop fingers connected with the keys numbered 9, or in other words since there are a total of 14 rows of keys, 14 stop fingers will be disposed within each of the spaces 86. The next space 86 down from the top will receive the 14 stop fingers connected to keys numbered 8. The next space 86 receives the 14 stop fingers connected to the keys numbered 7 and so on down to the last space between the magnets which will receive all of the stop fingers connected to the keys numbered 0. As seen most clearly in FIG. 2, the stop fingers extend substantially at right angles to the longitudinal axis of the frame and are not flush with the surfaces of the magnets, but an edge portion of the stop fingers engages the legs of the adjacent magnet. This engagement is sufficient to retain the stop fingers in any adjusted position, or in other words, the magnetic attraction between the magnets and the stop fingers which are formed of magnetic material is sufficient to insure that the stop fingers and associated arms and keys will remain either in their up or down positions as selected.

As mentioned previously, keys 57—60 represent clearing keys. It is apparent that the two sides of the keyboard as seen in FIG. 2 are substantially symmetrical and it should be understood that the structure associated with key 57 is substantially identical with that associated with key 59 and in like manner the structure associated with key 58 is substantially identical with that associated with key 60. Keys 57 and 59 are adapted to clear or move into upper inoperative position all of the keys in the groups of keys 51 and 54 respectively. Key 57 is connected rigidly to member 90 which is in turn connected to a U-shaped clearing frame 91 which is pivotally supported upon pins 92 mounted in the forward and rearward walls of the keyboard frame. A spring 93 is connected between member 90 and an inturned flange of side wall 32 for normally urging member 90 in an upward direction whereby the clearing frame 91 will be out of engagement with the associated arms which it is adapted to engage.

Key 58 is connected to a member 95 which is in turn connected to a U-shaped clearing frame 96 within which clearing frame 91 is nested. Clearing frame 96 also is pivotally supported upon pins 92. A spring 97 is connected between member 95 and the inturned flange of side wall 32 of the keyboard frame for urging member 95 upwardly to cause clearing frame 96 to be out of engagement with the associated arms which it is adapted to engage.

Key 59 is connected to a member 100 which is in turn connected to a U-shaped clearing frame 101 similar to clearing frame 91, clearing frame 101 being pivotally supported upon pins 102 mounted in the forward and rearward walls 30 and 31 of the keyboard framework. A spring 105 is connected between member 100 and an inturned flange formed on side wall 33 for urging member 100 and the associated clearing frame upwardly about its pivot so that the clearing frame will be out of engagement with the associated arms which it engages.

Key 60 is connected to a member 107 which is in turn connected with a U-shaped clearing frame 108 which is nested about clearing frame 101, clearing frame 108 also being pivotally mounted about pins 102. A spring 110 is connected between member 107 and the inturned flange formed on side wall 33 for urging member 107 and the associated clearing frame 108 upwardly about its pivot to urge the clearing frame out of engagement with the associated arms which it is to engage.

Referring now particularly to FIG. 6 of the drawings, the configuration of the laterally inward portions of clearing frames 101 and 108 is illustrated. Referring firstly to the inner nested U-shaped clearing frame 101, the inner wall 115 thereof is formed with a plurality of upstanding shoulders 116 which are separated from one another by notches 117. Shoulders 116 also include a narrow upstanding finger-like projection 120 formed along one edge thereof.

The inner wall 125 of the U-shaped clearing frame 108 is provided with upstanding shoulders 126 separated from one another by notches 127. As shown, each of the clearing frames 101 and 108 is disposed such that the shoulders thereon are out of engagement with the associated arms 73 and 74 under the influence of springs 105 and 110.

It will be noted that three arms 74 are disposed adjacent one another and four arms 73 are disposed adjacent one another, these arms being associated with the groups of keys in groups 54 and 53 respectively.

The projections 120 extend up between these groups of arms to insure that arms 73 and 74 are retained in proper spaced separated relationship with respect to one another. It will further be noted that the extent of the upper edges of shoulders 116 and 126 and the position thereof is such that when frames 101 and 108 are pivoted about pins 102, the upper edges of shoulders 116 will engage the under surfaces of all of arms 74, but will not engage the under surfaces of any of arms 73. On the other hand, the upper surfaces of shoulders 126 will engage the undersurfaces of all of arms 73, but none of arms 74. In this manner, actuation of clearing frame 101 will serve to move all of arms 74 into inoperative position, and actuation of clearing frame 108 will serve to move all of arms 73 into inoperative or raised position, the actuation of clearing frames 101 and 108 being completely independent of one another.

The construction of clearing frame 91 is substantially identical with that of clearing frame 101, and the construction of clearing frame 96 is substantially identical with that of clearing frame 108. Accordingly, a detailed description of the shoulders and notches formed on clearing frames 91 and 96 is not necessary, since it is apparent that these clearing frames operate in exactly the same manner as clearing frames 101 and 108. Accordingly, clearing frame 91 serves to clear all of the arms 71 associated with the keys in the group 51, and clearing frame 96 serves to clear or move upwardly into inoperative position all of the arms 72 associated with the keys in group 52.

As seen especially in FIGS. 1–3, 7 and 8, a pair of guide members 130 and 131 are supported on the inner surface of side walls 21 and 22 respectively, each of the guide members having a U-shaped cross sectional configuration for slidably supporting therein the opposite edge portions of a flat plate 133, plate 133 having an elongated slot 134 formed lengthwise thereof and a shorter longitudinally extending slot 135 spaced therefrom. The lower end of the plate is upturned and bent over at 136 to provide an upwardly projecting portion which may be manually grasped for urging the plate forwardly when desired. As seen especially in FIGS. 7 and 8, the forward edge 137 of the plate is sloping and is adapted to engage stop members formed on the slide bars of the apparatus.

A relatively thin upstanding plate 140 is provided with a shoulder 141 projecting upwardly therefrom, this shoulder serving as a detent means when projecting within slot 135 of the plate for holding the plate in an upper forward position. The lower end of plate 140 is connected to a leaf spring 142 attached at 143 to the lower member 11 of the frame. Spring 142 constantly urges plate 140 in an upward direction such that the shoulder 141 thereon tends to project through the slots on the plate.

A detent release mechanism is provided in the form of a plunger 145 which is slidably mounted on the forward wall of the keyboard frame by means of screws 146 extending through slots therein, the plunger terminating in a downwardly extending arm 147 which is adapted to engage the upper edge of plate 140 for urging the plate 140 in a downward direction to release the detent shoulder 141. It is noted that shoulder 141 is provided with a sloping surface 141' which upon forward movement of the plate tends to cam the detent plate downwardly to enable the shoulder to pass out of slot 134 and into slot 135. A spring 150 is connected between arm 147 of the release plunger and a portion 151 extending outwardly from the forward wall of the keyboard frame. A release key 152 is connected to the upper end of plunger 145 for actuating the plunger.

A plurality of slide bars 160 are provided, these slide bars being substantially similar in construction, each slide bar being a relatively thin elongated bar having ribs 161 formed therein for strengthening purposes, the slide bars being formed of a suitable non-magnetic material such as aluminum so that they will not be affected by the magnetic push rods hereinafter described. As seen in FIG. 1, one of the slide bars is illustrated and is provided with an integral shoulder 162 and an upstanding stop member 163, the shoulder and stop member being adapted to engage certain of the stop fingers as hereinafter described.

A first guide member 165 extends between and is connected to the opposite side walls 21 and 22, and a second guide member 166 also extends between and is connected to the opposite side walls. Each of these guide members 165 and 166 is provided with a plurality of notches, 14 in number within each of which is received one of the 14 slide bars 160. The slide bars 160 are 14 in number such that each slide bar is controlled by one of the rows of keys in the various groups of keys, there being 14 rows of keys. It is evident that the guide members will keep the slide bars properly aligned so that they will engage the proper stop fingers of the keyboard mechanism.

A first shaft 167 extends below and is mounted in the opposite side walls 21 and 22 of the frame, a plurality of rollers 168 being journaled on shaft 167 for free rotation with respect thereto. Rollers 168 are provided with hubs for properly spacing the rollers, there being 14 rollers, each of which receives one of the slide bars 160. Another shaft 169 extends between and is mounted in the opposite side walls, a plurality of rollers 170 being mounted on this shaft and properly spaced from one another by integral hubs such that each of the rollers receives one of the slide bars.

The rollers 168 and 170 support spaced portions of each of the slide bars such that the slide bars are freely movable longitudinally of the frame. It is evident that due to the inclination of the frame and the rollers, the slide bars will tend to move downwardly toward the left as seen in FIG. 1, under the influence of gravity. A bar 175 extends between the opposite side members and an L-shaped member 176 is secured to the bar by a screw 177, the lower edge of member 176 engaging the upper edges of the slide bars for maintaining the slide bars in proper operative position.

As seen in FIG. 1, 10 printing members 180 are mounted upon each of the slide bars 160, the construction being substantially identical for each slide bar. The slide bar is provided with 11 openings 181 spaced from one another, offset portions 182 being formed at the lower edge of each of said openings, and similar offset portions 183 being struck out at the lower edge of the slide bars. These offset portions 182 and 183 are formed in pairs adjacent the openings and may be seen most clearly in FIGS. 9, 12 and 14. An elongated strip of material 185 extends in spaced relationship to each of the slide bars, and in spanning relationship to each of the openings 181 formed therein. Strip 185 is provided with a plurality of spaced bent-over fingers 186, each of these fingers being bent around and snugly engaging the adjacent struck-out portions 182 and 183 of the slide bars. In this manner, strip 185 is mounted in operative position and a plurality of spaces are defined between adjacent pairs of the struck-out portions 182 and 183 and between the slide bar and the strip 185. 10 such spaces are provided, and a printing member 180 is disposed within each of said spaces.

Each of the printing members 180 comprises an elongated bar of magnetic material such as iron having a substantially rectangular cross section and having a slight clearance with respect to the space within which it is disposed such that the printing members can readily reciprocate within such spaces. Suitable conventional printing characters are secured to the lower ends of each of the printing members in a well-known manner. Disposed within each of the spaces and bearing against one side wall of each of the printing members is a leaf spring 190, these leaf springs serving to retain the printing members in the upper position as shown in FIG. 1, for example, when the printing members are not actuated by the push rods hereinafter described.

As seen in FIG. 1, the printing members 180 are spaced from one another approximately ½ the distance longitudinally of the slide bars as the stop fingers illustrated of the keyboard mechanism are spaced from one another. Accordingly, in order to obtain proper positioning of the printing characters in accordance with the actuated keys, the printing members are arranged such that the right-hand most printing member has a 0 printing character at the lower end thereof, the next printing member has a 5 printing character thereon, the next printing member has a 1 printing character at the lower end thereof and so on as indicated by the numbers shown on the strip 185 for the sake of clarity. Of course, these numbers are not provided normally, but are merely put on the drawings to illustrate the arrangement of the various printing members.

Referring now especially to FIGS. 13—15, the operating mechanism of the apparatus is illustrated. Side walls 21 and 22 are provided with cut-out portions at that portion thereof which overlies the tubular member 13, and the walls extend forwardly and have outwardly extending integral flanges formed at the upper edges thereof and indicated by reference numerals 195 and 196 respectively. A pair of upstanding support members 200 and 201 are rigidly secured to the opposite wall portions 21 and 22 respectively as by welding or the like. This provides a relatively rigid support structure for the operating mechanism of the apparatus. A shaft 205 extends between and is journaled in the opposite spaced walls of casing 203, a hand wheel 206 being rigidly secured to one outwardly projecting end of the shaft, and a circular cam 207 is secured by means of a set screw 208 to an intermediate portion of the shaft. It is apparent that rotation of hand wheel 206 by means of handle 210 will produce rotation of the actuating cam 207.

A reciprocating yoke means includes an upper cross member 215 formed integral with two depending portions 216 and 217, each of these depending portions having a substantially U-shaped configuration and snugly fitting about support members 200 and 201, yet having a sliding fit therewith to permit reciprocation of the yoke.

Fixed to the upper surface of cross member 215 of the yoke is a substantially U-shaped bracket 220, bracket 220 forming with cross member 215 a framework within which cam 207 is received, the vertical dimension of this farmework being identical with the diameter of cam 207 such that any rotation of the cam will produce a reciprocating action of the yoke mechanism.

A supporting bracket 225 is secured by screw 226 to the inner surface of one wall of casing 203 and serves to support the lower end of a coil spring 230. Another bracket 231 is secured by means of screw 232 to the upper end of support member 200 and includes a horizontally extending arm 233 which overlies bracket 225 and is adapted to engage the upper end of spring 230 when the device is in neutral position.

Yet another bracket 235 is secured by means of screw 236 to the bracket 220 which is fixed to the reciprocating yoke mechanism. Bracket 235 includes integral arms 240 and 241 which as seen for example in FIG. 10 extend on either side of coil spring 230 and include turned-over upper end portions 240′ and 241′ which are adapted to engage the upper end of the coil spring. It will be noted that the turned-over upper ends of arms 240 and 241 are spaced apart sufficiently to receive therebetween arm 233 of the bracket 231 fixed to the upper end of support member 200.

Extending between and connected to members 216 and 217 of the yoke mechanism is a bar 250, bar 250 having a first substantially rectangular frame 251 formed integral with one side thereof and a second substantially rectangular frame 252 formed integral with the other side thereof. Frame 251 is provided with a pair of aligned openings 253 and 254 in the opposite portions thereof, a threaded shaft 255 extending downwardly through these openings. A threaded nut 256 is fixed to the under surface of the upper member of the frame and threadedly receives shaft 255 such that upon relative rotation of the shaft with respect to the nut, the shaft will move downwardly through openings 253 and 254.

Frame 252 is provided with a pair of openings 260 through the upper portion thereof and a pair of openings 261 through the lower portion thereof aligned with the openings 260. Nuts 262 are fixed to the under surface of the upper portion of frame 252 and are internally threaded, threaded shafts 263 and 264 extending downwardly through the openings and being threadedly received within the nuts 262 such that relative rotation of the shafts with respect to the nuts causes downward movement of the shafts with respect to the frame.

A shaft 270 is rotatably mounted on the upper surface of bar 250 and includes a knob 271 secured at the upper end thereof for rotating the shaft. A gear 272 is fixed to the shaft and is provided with elongated teeth which engage teeth formed on gears 273, 274, and 275 mounted on shafts 255, 264 and 263 respectively. It is evident that rotation of hand knob 271 will produce rotation of each of shafts 255, 263, and 264 to move the shafts with respect to the supporting yoke mechanism.

A plate 280 is supported at the lower ends of shafts 255, 263, and 264, the lower ends of each of the shafts including a reduced portion which extends through suitable openings in the plate and having an enlarged outer end shoulder which retains the plate on the shafts. Opposite end portions of plate 280 are turned downwardly and a frame 285 of substantially U-shaped cross section is suspended from plate 280 by means of bolts 286 threaded downwardly into frame 285. Interposed between plates 280 and 285 is a resilient pad 287 formed of rubber or similar material.

The upper wall 290 and the lower wall 291 of frame 285 are provided with 18 pairs of aligned openings through which 18 rods extend, the upper ends of each of of these rods having an enlarged head thereon for retaining the rods in position and engaging the rubber pad 287. Certain of these rods are push rods and certain other of the rods are merely guide rods. The push rods are 14 in number corresponding to the 14 slide bars and are indicated by reference numerals 295, the remaining rods 296 being guide rods and being four in number. The push rods are magnetic and cooperate with the printing members of magnetic material as hereinbefore discussed, whereas the guide rods 296 need not be of magnetic material. A push rod is disposed closely adjacent each of the slide bars and is adapted to move downwardly to engage one of the printing members supported by the associated guide bar during the printing operation. It is apparent that the slide bars are disposed between and are maintained in spaced relationship by the push rods. The four additional guide rods serve to help guide one of the slide bars of each group of slide bars which is not engaged on each side by a push rod. It is further apparent that the push rods and slide bars are associated in two outer groups of three and two inner groups of four corresponding to the arrangement of the rows of keys on the keyboard.

As seen most clearly in FIGS. 1, 7, 8, and 16, the inking mechanism includes an ink pad support means indicated generally by reference numeral 300 including a flat plate-like portion 301 having four ink pads 302 supported thereon in staggered relationship and including two longitudinally extending projections 303 and 304 formed at the opposite edges thereof, the projections 303 and 304 terminating in laterally extending arms 303' and 304' which are slidably positioned within guide members 305 and 306 respectively which are secured to the opposite walls 21 and 22 of the frame and are of substantially U-shaped cross section. As will be noted in FIG. 16, for example, the height of the guide members is greater than that of the ink pad support means such that the ink pad support may move laterally of the slide bars as well as longitudinally thereof.

The outer end of the ink pad support means is turned over at 301' and extending through this turned over portion is a shaft 310 which extends through slots 311 and 312 formed in side walls 21 and 22 respectively of the frame, the outer ends of the shaft terminating in enlarged portions for maintaining the shaft in operative position. As the ink pad support reciprocates during operation, shaft 310 slides back and forth in the slots provided in the side walls of the frame.

As seen in FIG. 16, the forward ends of slots 311 and 312 curve downwardly and open at the lower edge of the respective side walls 21 and 22. This permits the shaft 310 to be easily moved out of the slots for removing the ink pad support means when it is desired to ink the ink pads.

A spring 315 is connected by a bolt 316 to the frame and extends between the frame and a portion of plate 301, spring 315 normally biasing the ink pad support means to the position shown in FIG. 16, wherein shaft 310 is at one end of the slots formed in the side walls. When in this position, the ink pads 302 are disposed directly under the respective push rods of the operating mechanism. This position may be understood most clearly by an inspection of FIG. 7, wherein the normal staggered relationship of the various push rods as well as that of the ink pads is illustrated. In this position, the ink pads are directly under the push rods, the push rods always being in this particular staggered relationship which enables the printing material to appear on four different lines one under the other as the tickets are moved under each successive group of push rods.

As seen most clearly in FIGS. 1, 14 and 16, a pair of lifter members 320 and 321 are secured to the inner surface at the lower ends of portions 217 and 216 respectively of the yoke mechanism. Lifter members 320 and 321 accordingly reciprocate along with the reciprocating yoke mechanism and include laterally inwardly extending arms 320' and 321' at the lower ends thereof. Each of these arms is provided with suitable openings receiving a bolt 323, these threaded bolts 323 being threadedly received within internally threaded nuts 324 secured to the under surface of arms 320' and 321'. The upper ends of bolts 323 engage the under surface of plate portion 301 of the ink pad support means to urge the ink pads upwardly into inking engagement with the printing members. It is apparent that the bolts may be adjusted if necessary to obtain the proper inking engagement between the inking pads and the printing members. A pair of levers 330 and 331 are of identical construction, the levers being pivotally mounted upon pins 332 and 333 respectively, which are mounted in the side walls 21 and 22 of the frame. These levers include at one end thereof elongated slots 335 which engage pins 336 secured to members 217 and 216 of the reciprocating yoke mechanism. Accordingly, pins 336 reciprocate upwardly and downwardly along with the reciprocating mechanism and produce pivotal movement of the levers about the pivot axes thereof. The lower ends of each of the levers include a flat surface 337 adapted to engage portions of the shaft 310 secured to the ink pad support means. In this manner, pivotal movement of the levers in cooperation with spring 315 determines the position of the ink pads longitudinally with respect to the slide bars.

As seen most clearly in FIGS. 10 and 14, the advancing mechanism for a strip of tickets includes a pair of pivoted levers 340 and 341, these levers being pivotally mounted upon arms 342 and 343 respectively which are secured to the fixed support members 200 and 201. Arms 340 and 341 have formed at the upper ends thereof elongated slots 344 and 345 which receive pins 346 which are mounted on arms 347 and 348 respectively, these latter arms 347 and 348 being fixed to the portions 216 and 217 of the reciprocating yoke mechanism. It is apparent that reciprocatory movement of the yoke mechanism will produce oscillation of arms 340 and 341 about the pivotal axes thereof.

The mechanism associated with arm 340 is adapted to push the tickets through the apparatus and includes a downwardly extending resilient spring-like arm 350 which is pivotally mounted about a pin 351 mounted on arm 340, a wire spring 352 being wound about the pin 351 and engaged within an opening 353 with the opposite end of the spring bearing downwardly on arm 350 to urge it in a downward direction. The lower end portion of arm 350 is turned up at 355 and an auxiliary piece 356 is secured to the under surface thereof and spaced from the end thereof to fit within one of the slots provided in a strip of tickets.

The mechanism associated with arm 341 is adapted to pull the strip of tickets through the mechanism and includes a resilient spring-like arm 360 which is pivotally mounted about pin 361 mounted on arm 341. A wire spring 362 is wrapped around pin 361 and has one end portion thereof extending through an opening 363 formed in the arm. The opposite end of the spring normally urges arm 360 down into engagement with the strip of tickets. The lower end portion of arm 360 is provided with an arcuate configuration and includes a downwardly extending projection 365 which is adapted to fit within one of the slots in a strip of tickets for pulling the strip of tickets through the apparatus.

A first elongated support bracket 366 is secured to the side of support member 200 and a similar support bracket 367 is secured to the side of support member 201. A first resilient spring member 368 is mounted on support bracket 366, and a second resilient spring member 369 is mounted upon support bracket 367. Each of these spring members is mounted such that it normally bears downwardly upon the upper surface of a strip of tickets which are advanced through the apparatus, the lower ends of the spring members each being curved in the direction of movement of the tickets through the apparatus to facilitate advancing movement thereof during operation. The purpose of these spring members is to maintain a constant pressure on a strip of tickets such that the strip will not move when the advancing mechanism is moving into a cocking position whereby the ticket strip will only be moved in one direction during operation.

Referring to FIG. 18, a typical strip of tickets is indicated by reference numeral 370 and includes a plurality of individual tickets 371 having slots 372 formed therebetween and extending substantially halfway across the width of the strip of tickets. Perforations 373 extend from the inner ends of the slots 372 to the opposite edge of the strip of tickets to facilitate the separation of the individual tickets from one another after the printing and marking operation is completed. As seen particularly clearly in FIG. 16 of the drawings, the strip of tickets is normally supported on the upper surface of tubular member 13 of the supporting frame, a member 375 serving as a guide means for engaging one edge portion of the tickets and a resilient plate 376 secured to the tubular member by bolt 316 engaging the opposite longitudinally extending edge of the tickets for maintaining the tickets in proper poistion and guiding them through the machine. It will be noted that members 375 and 376 are provided with shoulder portions 375' and 376' which project toward one another and overlie the marginal edges of the strip of tickets. These shoulder portions serve to acurately guide the tickets and maintain them in engagement with the underlying supporting surfaces. The space between resilient member 376 and the adjacent surface of tubular member 13 is adapted to receive the metal stapling means which is sometimes incorporated with this type of ticket and which would be adapted to fit down in this space as the tickets pass through the machine.

OPERATION

For the purpose of illustration, it will be assumed that it is desired to print upon the tickets in a certain arbitrary manner. This arbitrary manner as selected for the purpose of illustration is illustrated on the two tickets marked *a* and *b* in FIG. 18. These two tickets have been completely printed upon and it is apparent that the first line includes a first digit of 2, a blank space and a digit of 1. The second line includes a first digit of 3, a blank space, and two digits of 3 and 5. The third line includes a first digit of 6, a blank space, and two digits 7 and 6. The fourth or bottom line includes a first digit of 9, a blank space, and a last digit of 1.

It should, of course, be understood that in the illustrated embodiment, the top and bottom lines can only contain 3 digits while the two middle lines are adapted to contain four digits on a machine. In order to initiate operation of the apparatus, the apparatus is normally in a neutral position wherein the member 233 is aligned with the portions 240' and 241' of the indicator mechanism. The device is then in a neutral position as illustrated in FIG. 9 of the drawing. It will be assumed that the tickets have been inserted such that at least one ticket is underneath the lefthand group of three slide bars and associated printing members as seen in FIG. 9. Assuming that the device has been previously used and it is desired to change the setting, the clearing keys 57—60 will each be pushed downwardly to completely clear the keyboard or in other words to move all the keys into their uppermost inoperative positions. Of course, if the keys in any group 51, 52, 53 or 54 of keys are already in proper position, it is not necessary to clear this particular group with the associated clearing key.

The next step is to grasp the portion 136 of sliding plate 133 and move the plate to the right and upwardly as seen in FIG. 1 until the detent shoulder 141 projects within slot 135 of the plate. When this occurs, the plate will be in its uppermost position, and the forward edge 137 of the plate will be in engagement with the stop members 163 formed on each of the slide bars. This position is illustrated in FIG. 7 of the drawings. With the slide bars all urged upwardly such that the stop members 163 are disposed such that they are not beneath the stop fingers of the keyboard mechanism, the keyboard is in readiness to be actuated. Assuming it is desired to print the tickets as shown in *a* and *b* in FIG. 18, the key numbered 2 in the lefthand most column will be punched, no key will be punched in the middle column of group 51 of the keys, and key number 1 will be punched in the righthand column of keys in group 51. This will produce a finished result of a first digit of 2, a blank space, and another digit of 1 on the first line of tickets. Correspondingly, the key numbered 3 in the first column of keys in group 52 will be punched, no key will be punched in the second column, key number 3 will be punched in the third column and key number 5 will be punched in the fourth column. Similarly, in the group 53 of keys, key number 6 will be punched in the first column, no key will be punched in the second column, key number 7 will be punched in the third column and key number 6 will be punched in the fourth column. In the last group 54 of keys, key number 9 will be punched in the first column, no key will be punched in the second column and key number 1 will be punched in the third column.

After the selected keys have been punched, the release key 152 is pressed. This key releases detent plate 140 such that shoulder 141 moves downwardly thereby permitting the plate 133 to slide downwardly along with slide bars 160 under the influence of gravity. At this point, it may be noted that such movement of the slide bars and plate could be additionally insured by use of spring means, although this is not considered desirable in most instances.

As the slide bars 160 move downwardly under the influence of gravity, the stop members and shoulders formed on the slide bars will engage the stop fingers of the keys which have been punched to selectively position certain ones of the printing members mounted on the slide bars under the push rods of the operating mechanism. The position assumed by the various slide bars due to the interengagement of the stop fingers with the stop members and shoulders on the guide bars is illustrated in FIG. 8 of the drawing. It will be seen from this figure that the slide bars controlled by the columns in which no keys were punched move all the way downwardly such that the stop members thereon engage the forward edge 137 of plate 133. In this position, the push rods will not engage any of the printing members and consequently nothing will be printed by these particular push rods during operation of the apparatus.

It will be seen that in the position shown in FIG. 8, the slide bars are so positioned that the selected printing members for each column are directly under the push rods associated therewith. For example, key number 2 was punched in the left-hand column of group 51. Referring to the lefthand most slide bar as seen in FIG. 8, it will be seen that the push rod associated with this slide bar is directly over the printing member upon which character 2 is positioned. It will be seen that the push rod is over the fifth printing member from the top, and referring to FIG. 1, it is apparent that the fifth printing member from the righthand end is provided with the character 2.

In a similar manner, each of the push rods is directly over the desired printing member mounted on the associated slide bar. Accordingly, the push rods and printing members are now in proper operative relationship to one another and are ready for the printing operation. The machine has now been set up for operation, and rotation of handwheel 206 will now produce the desired printing and working cycle of the machine. Assuming that the device is in neutral position as shown in FIG. 7, initial rotation of the handwheel in a clockwise direction will rotate the cam 207 clockwise producing an initial upward movement of the reciprocating yoke mechanism. Such upward movement of the yoke mechanism will cause the lifter members 330 and 331 to lift the inking pads upwardly into inking engagement with the characters formed on the lower ends of the printing members. This position is shown in FIG. 14 of the drawings. The position of the indicator mechanism when the mechanism is in the position shown in FIG. 14 is illustrated in FIG. 15. Continued rotation of the handwheel in a clockwise direction will cause the yoke mechanism to be reciprocated in a downward direction. As the yoke mechanism moves downwardly, the push rods move down into engagement with certain ones of the printing members mounted on the associated slide bars. Further downward movement of the yoke mechanism forces the printing members downwardly into printing engagement with the tickets therebeneath, this position being shown in FIG. 12 wherein the yoke mechanism is in its downward most position, and the printing characters are engaged with the tickets. It will be noted that as the printing members engage the tickets, the upper ends of the push rods are adapted to compress the resilient pad 287 to produce a cushioning effect to reduce the shock created when the printing members engage the tickets.

Further rotation of the handwheel in a clockwise direction from the position shown in FIG. 12 will raise the yoke mechanism until the device again reaches the neutral position shown in FIG. 9.

As the push rods move upwardly, the magnetic attraction between the push rods and the printing members will move the printing members upwardly until the enlarged lower portions thereof engage the lower surfaces of the slide bars whereupon the push rods will continue to move upwardly until the mechanism again reaches the position shown in FIG. 9.

It is apparent that whereas the pad 287 provides a resilient cushioning effect, it may nevertheless be desired to adjust the amount of compression produced by the push rods on the printing members. This can be accomplished by turning hand knob 271 as desired to adjust the portion of plate 280 and the supported push rods with respect to the reciprocating yoke mechanism.

The aforementioned mode of operation illustrates the manner in which the printing mechanism operates. It is, of course, understood that at the same time the inking mechanism is being reciprocated longitudinally of the slide bars. The manner in which the ink pads are moved upwardly has been previously described.

Additionally, as the reciprocating yoke moves downwardly, levers 330 and 331 are pivoted toward the dotted line position shown in FIG. 16. As the levers swing in such direction, they engage shaft 310 connected with the ink pad support means and move the ink pad support outwardly out of the path of transverse movement of the printing members with respect to the slide bars.

As the reciprocating yoke mechanism again moves upwardly, levers 330 and 331 return to their full line position shown in FIG. 16, and spring 315 returns the inking pads into position beneath the push rods and printing members whereupon the inking pads can again be moved upwardly into inking engagement by the lifter members 320 and 321. Simultaneously with the printing and inking operations, the advancing mechanism is sequentially moving the tickets through the machine. As the reciprocating yoke moves downwardly, arms 340 and 341 are pivoted such that arms 350 and 360 thereof move toward the left as shown in FIG. 9.

This movement of the arms is a cocking movement, and when the reciprocating yoke mechanism reaches its lowermost position, the shoulders formed by members 356 and 365 move downwardly into slots formed in the strip of tickets. As the reciprocating mechanism then moves upwardly and after the printing has occurred on each of the tickets disposed beneath the printing members, the arms 340 and 341 pivot in the opposite direction to move arms 350 and 360 to the right as seen in FIG. 9, thereby moving the strip of tickets in the righthand direction as seen in this figure and moving the tickets a distance substantially equal to the width of the tickets.

It will be apparent that arm 350 associated with arm 340 will push the tickets through the apparatus and will continue to engage additional tickets until the end of the strip is reached whereupon it will advance the last ticket of the strip underneath the first group of printing members. After the last ticket has been so advanced, member 350, along with arm 340 has no further effect on the strip of tickets, and the member 360 along with arm 341 serves to pull the strip of tickets completely through the apparatus thereby insuring that the last four tickets of the strip are completely printed, even after member 350 ceases to engage the strip of tickets.

Referring to FIG. 18, the manner in which the tickets are printed may be more clearly understood. As seen in FIG. 18, the ticket marked c has been advanced under the first group of three slide bars and push rods as seen in FIG. 9, and the top line has been printed thereon. The ticket marked d has been advanced a step farther than the ticket marked c and has additionally had the second line printed thereon. The ticket marked e in FIG. 18 has been advanced three steps beneath the printing members and has had the first three lines printed thereon. Ticket a in turn has been advanced through all four stages beneath the printing members and has received four lines of printing. Ticket b has also been completely printed upon. It is accordingly apparent that each line of printing is successively printed upon the tickets as they are sequentially advanced through the machine.

It is evident that handwheel 206 may be continuously rotated to print upon a large number of tickets which are fed through the machine by the advancing mechanism. If it is desired to at any time change the printed matter impressed upon the tickets, the procedure can again be repeated for clearing the keyboard and re-positioning the slide bars.

It is apparent from the foregoing that there is provided a new and novel ticket marking machine which selectively prints a plurality of lines, one under the other on individual tickets of an elongated strip of tickets. The apparatus includes means for easily selecting and varying the printing matter and includes a printing mechanism which is positive acting, yet which is cushioned against shock.

The apparatus includes effective inking means to ink the printing characters of the device during each cycle of operation of the apparatus, and feed means is provided for automatically advancing the individual tickets sequentially through the machine such that the different lines are printed thereon at various stages.

The apparatus may be easily operated by inexperienced personnel and is substantially fool-proof during operation. The device is relatively compact and inexpensive in construction, and yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A ticket marking machine including printing means for printing information upon tickets, said printing means including a plurality of elongated support members mounted on said machine for linear movement, a plurality of different character members movably supported by said support members, selecting means associated with said printing means for determining which of said character members are in printing position during a cycle of operation of the machine, means engaging each of said support members for guiding the movement of the support members and mounting the support members for free reciprocatory movement, control means for maintaining said support members in a forward position, said machine including a base means for resting on a supporting surface, the support members being disposed obliquely to said base means such that when in operative position on a substantially horizontal surface, the support members are disposed at an angle to the horizontal such that they slide downwardly into a rearward position solely under the influence of gravity upon movement of said control means, means for operating the machine to move the printing means into printing relationship with respect to tickets to be printed upon, and means for advancing tickets through the machine for disposing tickets in operative relationship with respect to said printing means.

2. Apparatus as defined in claim 1, including inking means supported adjacent said printing means, and means for moving said printing means and said inking means into engaging relationship to ink certain portions of said printing means.

3. A ticket marking machine comprising a supporting frame, a keyboard selecting means supported on said frame, a printing means supported on said frame and including a plurality of different printing members, support means upon which said printing members are supported, said printing support means being mounted for linear movement with respect to said supporting frame, said printing members being movably supported on said support means, the position of said printing members with respect to said frame being determined in accordance with actuation of said keyboard selecting means, means engaging each of said support means for guiding the movement of the support means and mounting the support means for free reciprocatory movement, control means for maintaining said support means in a forward position, said machine including a base means for resting on a supporting surface, the support means being disposed obliquely to said base means such that when in operative position on a substantially horizontal surface, the support means are disposed at an angle to the horizontal such that they slide downwardly into a rearward position solely under the influence of gravity upon movement of said control means, means for moving said printing members into and out of printing relationship with tickets upon which it is desired to print, and means for sequentially moving tickets into operative relationship with respect to the printing means of the apparatus.

4. Apparatus as defined in claim 3, wherein said keyboard selecting means includes a plurality of keys and stop fingers, means operatively connecting said keys to said stop fingers which govern the position of the printing members by engaging portions of said support means, and clearing means mounted adjacent said keys and positioned to engage portions of the connecting means between said keys and stop fingers for clearing the selecting means to move all the keys into inoperative position.

5. A ticket marking machine comprising a supporting frame, a keyboard selecting means including a plurality of keys, each of which is operatively connected with a stop finger, a plurality of elongated support members movably mounted on said supporting frame, means engaging each of said support members for guiding the movement of the support members and mounting the support members for free reciprocatory movement, control means for maintaining said support members in a forward position, said machine including a base means for resting on a supporting surface, the support members being disposed obliquely to said base means such that when in operative position on a substantially horizontal surface, the support members are disposed at an angle to the horizontal such that they slide downwardly into a rearward position solely under the influence of gravity upon movement of said control means, each of said support members including at least one portion adapted to engage certain of said stop fingers, means for causing movement of said support members to cause said one portion to engage said stop fingers, each of said support members supporting a plurality of printing members which are mounted for movement with respect thereto, operating means including members adapted to engage said printing members after positioning of said printing members by movement of said support members for moving the printing members into printing position, and means for automatically inking certain of said printing members during an operating cycle of the machine.

6. A ticket marking machine including a supporting frame, a keyboard selecting means mounted on said frame, said keyboard selecting means including a plurality of keys and stop fingers, means operatively connecting each key to a stop finger, said keys being movably mounted for moving said stop fingers into and out of operative position, means for maintaining said stop fingers in operative or inoperative position, and clearing means movably mounted adjacent said keys and positioned to engage portions of the connecting means being said keys and stop fingers for moving the stop members into inoperative position, a plurality of elongated slide bars, means engaging each of said slide bars for guiding the movement of the slide bars and mounting the slide bars for free reciprocatory movement, control means for maintaining said slide bars in a forward position, said machine including a base means for resting on a supporting surface, the slide bars being disposed obliquely to said base means such that when in operative position on a substantially horizontal surface, the slide bars are disposed at an angle to the horizontal such that they slide downwardly into a rearward position solely under the influence of gravity upon movement of said control means, each of said slide bars including portions positioned to engage certain ones of said stop fingers upon movement of said slide bars in said one direction, a plurality of printing members supported by each of said slide bars and mounted for movement transversely with respect thereto, operating means for selectively moving certain ones of said printing members into printing position, and means for automatically inking certain ones of said printing members during an operating cycle of the machine.

7. Apparatus as defined in claim 6, wherein each of said slide bars includes a shoulder adapted to engage certain of said stop fingers, and a spaced stop member adapted to engage certain others of said stop fingers, each of said slide bars being mounted for reciprocating movement with respect to said frame to move into and out of operative relationship with respect to said stop fingers.

8. Apparatus as defined in claim 6, including spaced guide means for guiding movement of said slide bars to insure proper alignment of said slide bars with respect to said stop fingers and said operating means during operation of the machine.

9. A ticket marking machine comprising a support means, a keyboard selecting means supported on said support means, a plurality of support members movably supported by said support means for movement with respect thereto, the position of said support members being determined by selective operation of said keyboard selecting means, a plurality of printing members movably supported on each of said support members, and operating means for moving said printing members toward and away from printing position, said operating means including a yoke means slidably supported by said support means, means for moving said yoke means toward and away from said printing members, a plurality of push rods being operatively connected with said yoke means for movement therewith, said push rods being magnetic and said printing members being of magnetic material such that said printing members follow the movement of the associated push rods, means for automatically inking certain of said printing members during an operating cycle of the machine, and means for advancing tickets with respect to the printing members of the machine.

10. Apparatus as defined in claim 9, wherein said push rods are resiliently supported by said yoke means for cushioning printing engagement of the printing members with associated tickets.

11. Apparatus as defined in claim 9, including means for selectively adjusting the position of said push rods with respect to said yoke means.

12. Apparatus as defined in claim 9, wherein said yoke means is spring biased toward a neutral position.

13. Apparatus as defined in claim 9, wherein said inking means comprises an ink pad support means having a plurality of ink pads mounted thereon, said ink pad support means being slidably supported by said frame, means normally biasing said ink pad support means in one direction with respect to the frame, and lever means engaging a portion of said ink pad support means and being connected with a portion of said yoke means for moving said ink pad support means in the opposite direction.

14. Apparatus as defined in claim 9, wherein said ticket advancing means includes a first pivoted linkage connected to said yoke means and adapted to engage and push a strip of tickets through the machine, and a second pivoted linkage connected to said yoke means and adapted to engage and pull a strip of tickets through the machine.

15. Apparatus as defined in claim 13, including a plurality of lifter members connected to said yoke means for reciprocatory movement therewith, said lifter means including portions adapted to engage said ink pad support means for moving the ink pad support means toward said printing members.

16. A ticket marking machine comprising a supporting frame, keyboard selecting means mounted on said frame and including a plurality of rows of selecting keys, each of which is connected to an arm member having an integral stop member formed adjacent one end portion thereof, said keyboard selecting means including a plurality of magnets and said stop members being formed of magnetic material, said magnets being spaced from one another such that stop fingers are adapted to fit within the spaces defined between the magnets, said magnets serving to retain the stop fingers in operative or inoperative position, clearing means including a plurality of pivotally mounted members supported closely adjacent said arms, resilient means normally urging said clearing members away from said arms, means for moving the clearing members into engagement with said arms for moving the stop fingers into inoperative position, a plurality of slide bars reciprocably mounted upon said frame, each of said slide bars including portions adapted to engage certain ones of said stop fingers, a plurality of printing members slidably supported upon each of said slide bars, means supported by said frame for moving said printing members into and out of printing position, means supported by said frame for inking certain ones of said printing members during each cycle of operation of the machine, and means supported by said frame for advancing tickets through the machine.

17. Apparatus as defined in claim 16, including operating means for actuating the apparatus, said operating means including a slidable yoke having push rod members connected thereto for engaging certain ones of said printing members, said yoke means being mounted for reciprocatory movement with respect to said support, and cam means engaging said yoke means for causing reciprocatory movement thereof.

18. Apparatus as defined in claim 16, wherein said inking means includes an ink pad support means slidably supported by said frame, a plurality of staggered ink pads supported on said support means, and means operatively associated with said ink pad support means for moving the ink pads toward and away from said printing members.

19. Apparatus as defined in claim 18, including resilient means connected with said ink pad support means normally urging said ink pad support means in one direction longitudinally with respect to said slide bars, the ink pad support means also being mounted for movement laterally with respect to said slide bars.

20. Apparatus as defined in claim 16, wherein each of said slide bars is elongated along a longitudinal axis thereof, said printing members associated with each of the slide bars being movable transversely to the longitudinal axis of the associated slide bar, and means engaging each of the printing members for retaining the printing members out of printing position.

21. Apparatus as defined in claim 20, wherein said slide bars include longitudinally extending lower edge portions, guide means for said slide bars, the lower edge portions of said slide bars being disposed in said guide means, and a pair of spaced rollers supported by said frame and disposed in engagement with the lower edge of each of said slide bars for mounting the slide bars for reciprocatory movement.

22. Apparatus as defined in claim 21, wherein said frame includes a base means for resting on a supporting surface, the frame being disposed obliquely to said base means such that when in operative position on a level horizontal surface, the slide bars are disposed at an angle to the horizontal such that they tend to slide downwardly under the influence of gravity beneath the keyboard selecting means such that portions of the slide bars will engage certain ones of the stop fingers.

23. Apparatus as defined in claim 17, including means connected for movement with said yoke means and engaging said ink pad support means for moving the ink pads supported on the ink pad support means into inking engagement with certain ones of said printing members.

24. A ticket marking machine comprising a support frame including a base portion and a body portion disposed at an oblique angle to said base portion, a keyboard selecting mechanism mounted upon said body portion and including a plurality of key members, an arm member connected to each of said key members and having an integral stop finger formed therewith and depending therefrom, a plurality of magnets supported adjacent said arms and spaced from one another such that said stop fingers project between said magnets for retaining the stop fingers in a selected position, a plurality of slide bars reciprocably supported by said body portion adjacent said keyboard, each of said slide bars including a shoulder and a spaced stop member for engaging certain ones of said stop fingers to position the slide bars in a desired operative position, a plate member slidably supported by said body portion and including a forward edge adapted to engage the stop members on said slide bars for urging the slide bars in one direction, the slide bars being freely movable in the other direction under the influence of gravity, detent means retaining said slidable plate member in one position, means for selectively releasing said detent means, guide means engaging said slide bars for causing the slide bars to move in predetermined paths, a plurality of printing members slidably supported by each of said slide bars and being movable transversely with respect to the slide bars, means normally retaining the individual printing members out of printing position, said body portion including a ticket support means along which tickets are advanced beneath the slide bars, a reciprocating yoke slidably supported by said body portion, a plurality of push rods operatively connected to said yoke and adapted to engage certain ones of said printing members for urging the printing members into printing position, drive means movably supported by said body portion for reciprocating said yoke, inking means movably supported by said body portion for movement toward and away from said printing members, and means connected for movement with said yoke and adapted to engage said printing means for urging the printing means toward said printing members.

25. Apparatus as defined in claim 24, wherein said push rods are magnetic and said printing members are formed of magnetic material whereby the printing members when in engagement with said push rods follow the movement thereof, the upper ends of said push rods being resiliently mounted so as to cushion printing engagement of the printing members with associated tickets, and means for adjusting the position of said push rods with respect to said yoke.

26. Apparatus as defined in claim 24, including means normally biasing said yoke to neutral position, and means indicating when the yoke is in neutral position as well as in various other operative positions.

27. Apparatus as defined in claim 24, including means for advancing a strip of tickets sequentially along that part of the body portion which supports the tickets, said ticket advancing means being operatively connected to said yoke.

28. Apparatus as defined in claim 27, wherein said ticket advancing means comprises a pair of arms pivotally supported by said body portion and having one end thereof connected to said yoke, the opposite end of one of said arms pivotally supporting a member adapted to engage and push a strip of tickets through said machine, the opposite end of the other of said arms pivotally supporting a member adapted to engage and pull a strip of tickets through said machine, said strip of tickets being advanced through the machine beneath the printing means of the machine.

29. A ticket marking machine comprising a supporting frame, a keyboard selecting means including a plurality of keys, each of which is operatively connected with a stop finger, a plurality of elongated support members movably mounted on said supporting frame, each of said support members including at least one portion adapted to engage certain of said stop fingers, means for causing movement of said support members to cause said one portions to engage said stop fingers, each of said support members supporting a plurality of printing members which are mounted for movement with respect thereto, operating means including members adapted to engage said printing members after positioning of said printing members by movement of said support members for moving the printing members into printing position, and means for automatically inking certain of said printing members during an operating cycle of the machine, said members for engaging the printing members comprising a plurality of magnetic push rods, said operating means causing reciprocation of said push rods during an operating cycle of the machine, said printing members being formed of magnetic material whereby the printing members are caused to follow the movement of said push rods as said push rods reciprocate during an operating cycle of the machine.

30. Apparatus as defined in claim 29, wherein said push rods are resiliently connected with said operating means so as to cushion movement of the printing members into printing position.

31. A ticket marking machine comprising a supporting frame, a keyboard selecting means including a plurality of keys, each of which is operatively connected with a stop finger, a plurality of elongated support members movably mounted on said supporting frame, each of said support members including at least one portion adapted to engage certain of said stop fingers, means for causing movement of said support members to cause said one portions to engage said stop fingers, each of said support members supporting a plurality of printing members which are mounted for movement with respect thereto, operating means including members adapted to engage said printing members after positioning of said printing members by movement of said support members for moving the printing members into printing position, and means for automatically inking certain of said printing members during an operating cycle of the machine, said inking means including an ink pad support means, and lifter means operatively connected to said operating means for lifting said ink pad support means toward said printing members cyclically during operation of the machine, and moving means for moving said ink pad support means away from said printing members cyclically during operation of the machine.

32. Apparatus as defined in claim 31, wherein said moving means comprises lever means movably supported by said supporting frame and connected to said operating means.

33. A ticket marking machine including a supporting frame, a keyboard selecting means mounted on said frame, said keyboard selecting means including a plurality of keys and stop fingers, means operatively connecting each key to a stop finger, said keys being movably mounted for moving said stop fingers into and out of operative position, means for maintaining said stop fingers in operative or inoperative position, and clearing means movably mounted adjacent said keys and positioned to engage portions of the connecting means below said keys and stop fingers for moving the stop members into inoperative position, a plurality of elongated slide bars movably supported by said frame, means for causing movement of said slide bars in one direction, each of said slide bars including portions positioned to engage certain ones of said stop fingers upon movement of said slide bars in said one direction, a plurality of printing members supported by each of said slide bars and mounted for movement transversely with respect thereto, operating means for selectively moving certain ones of said printing members into printing position, and means for automatically inking certain ones of said printing members during an operating cycle of the machine, each of said bars including a shoulder adapted to engage certain of said stop fingers, and a spaced stop member adapted to engage certain others of said stop fingers, each of said slide bars being mounted for reciprocating movement with respect to said frame to move into and out of operative relationship with respect to said stop fingers, a plate means slidably supported by said frame and including an edge portion movable into operative engagement with the stop members on said slide bars for moving upon movement of said plate means into a forward position all of the slide bars in a forward direction into such position that the keys of the keyboard may be freely adjusted into any desired position.

34. Apparatus as defined in claim 33, including detent means for engaging a portion of said plate means and maintaining said slidable plate in its forward position wherein said keys may be freely actuated, and means for selectively releasing said detent means to enable the plate means and the slide bars to move rearwardly into the proper operative position in engagement with said stop fingers as determined by the position of the stop fingers actuated by the keys of the keyboard.

References Cited in the file of this patent

UNITED STATES PATENTS

| | | |
|---|---|---|
| 1,245,500 | Peirce | Nov. 6, 1917 |
| 2,503,865 | Christian | Apr. 11, 1950 |
| 2,542,658 | Garbell | Feb. 20, 1951 |
| 2,708,873 | Braun | May 24, 1955 |
| 2,754,751 | Marsh | July 17, 1956 |
| 2,890,650 | Bone | June 16, 1959 |